Figure 1:
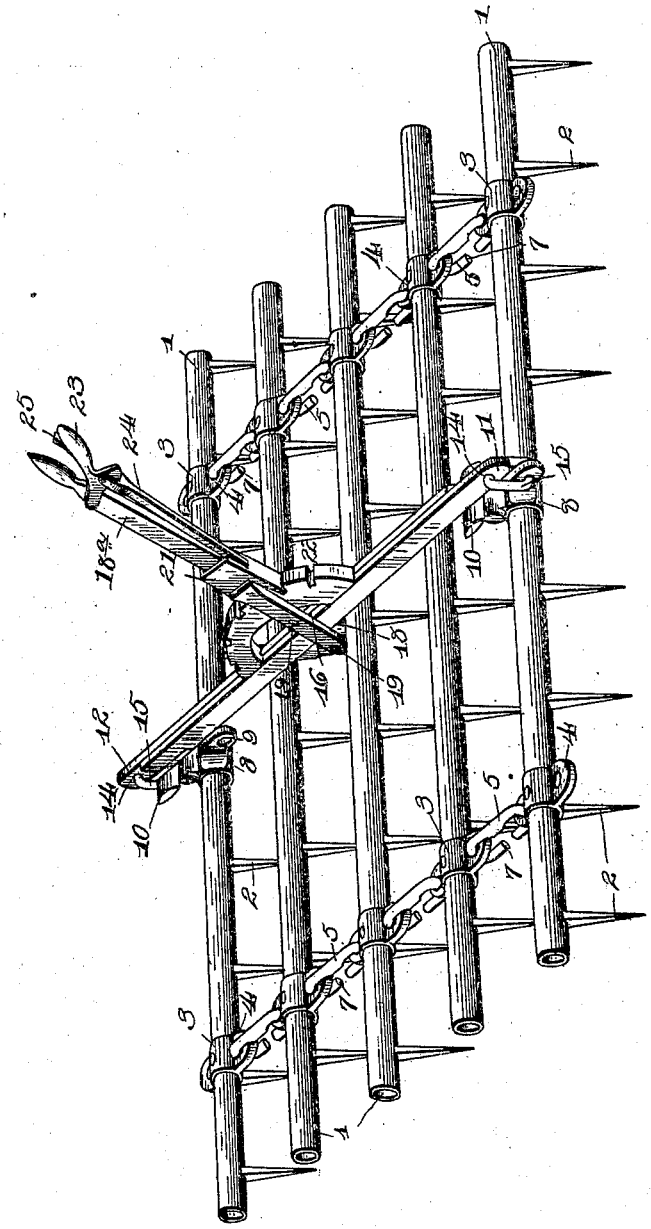

(No Model.) 2 Sheets—Sheet 1.

C. A. ANDERSON & J. S. WINSTON.
HARROW.

No. 502,391. Patented Aug. 1, 1893.

Witnesses
Chas. C. Ford.
Geo. C. Shoemaker.

Inventors
C. A. Anderson.
John S. Winston.
By their Attorneys,
C. A. Snow & Co.

(No Model.) 2 Sheets—Sheet 2.
C. A. ANDERSON & J. S. WINSTON.
HARROW.
No. 502,391. Patented Aug. 1, 1893.
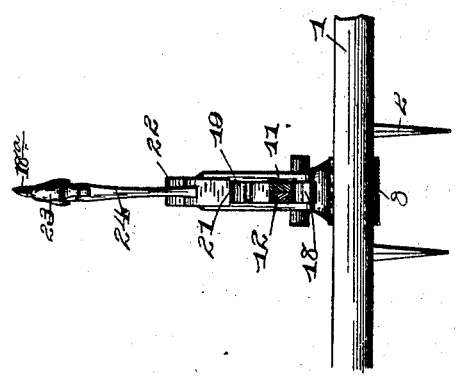
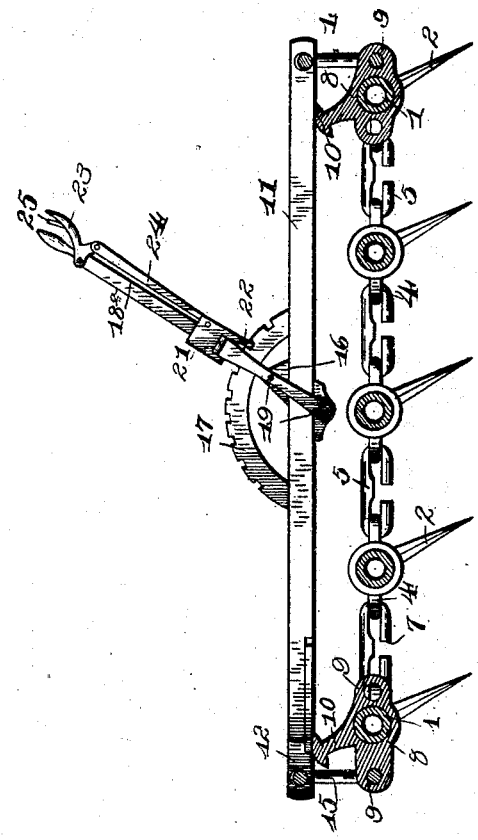
Witnesses
Chas A Ford
Geo. C. Shoemaker
Inventors
C. A. Anderson.
John S. Winston.
By their Attorneys,
C A Snow & Co.

UNITED STATES PATENT OFFICE.

CHARLES ALBERT ANDERSON AND JOHN SMALLWOOD WINSTON, OF STURGIS, KENTUCKY, ASSIGNORS OF ONE-HALF TO JESSE J. JONES AND JAMES S. WILSON, OF SAME PLACE.

HARROW.

SPECIFICATION forming part of Letters Patent No. 502,391, dated August 1, 1893.

Application filed August 4, 1892. Serial No. 442,182. (No model.)

*To all whom it may concern:*

Be it known that we, CHARLES ALBERT ANDERSON and JOHN SMALLWOOD WINSTON, citizens of the United States, residing at Sturgis, in the county of Union and State of Kentucky, have invented a new and useful Harrow, of which the following is a specification.

Our invention relates to improvements in harrows; and to that particular class thereof commonly termed "rigid teeth," in contradistinction to that class of harrows wherein the teeth are pivoted.

The objects of our invention are to produce a cheap and simple harrow that is light and portable, and whose operation may be governed by the operator, whereby it is adapted for different kinds of soil.

Other objects and advantages of the invention will appear in the following description, and the novel features thereof will be particularly pointed out in the claims.

Referring to the drawings:—Figure 1 is a perspective view of a harrow embodying our invention. Fig. 2 is a vertical longitudinal section. Fig. 3 is a transverse section through the lever and adjusting beam.

Like numerals indicate like parts in all the figures of the drawings.

In constructing our harrow we employ a series of transverse harrow bars, 1, which bars we preferably form of gas pipe whereby rigidity and strength are secured as well as lightness and cheapness. These bars 1 are provided each with a series of perforations formed eccentric with relation to the bars and passing transversely through the same. The perforations are staggered, that is, those of one bar occur intermediate to those of the adjacent bar so that when the teeth 2 are inserted they are out of alignment with each other. Each bar is provided with a pair of clips, or rings, 3 which are bolted to position upon the bar and are located a short distance from each end thereof. These clips or rings are provided at diametrically opposite sides with eyes 4, and are arranged upon the bars in such manner that when the bars are in vertical position, or rather when the teeth of the bars are in a vertical position, the clips are disposed at an angle of about forty-five degrees. The adjacent eyes of each pair of adjacent clips are connected by links 5. These links are what might be termed E-shaped and are provided with end openings that receive the eyes of the clips and at their sides with a transverse opening or entrance 7 by which they may be introduced over the eyes of the clips, and are hence removable. In this manner a greater or lesser number of harrow bars may be introduced into the harrow, as will be obvious. The front and rear bars have central clips 8, which like their companions, are provided at opposite sides with eyes 9, and are given a similar disposition. T-shaped standards 10 arise from each of the center clips, the purpose of which will hereinafter appear.

The adjusting bar comprises a pair of sliding-sections 11 and 12, each being provided with keepers 13 at their inner sides so as to receive and retain the opposite section. Perforations 14 are formed in the outer ends of the sliding sections, and links 15 serve to connect the perforations with the outer eyes of the center clips, said sections forming a beam, whose ends rest upon the T-shaped standards before mentioned. Rising from the section 12 is a small bearing standard 16 and the same is spanned by a curved notched locking standard 17 which is mounted upon the section 11. A fulcrum block 18 is formed upon the under side of the section 11 below the bearing standard 16 of the section 12.

18$^a$ designates a lever, whose lower end is bifurcated and loosely embraces the two sections, the fulcrum block, the standard 16 and the locking standard 17. Fulcrum pins 19 pivotally connect the bifurcations with the standard 16 of the section 12 and the fulcrum block 18 of the section 11. It will thus be seen that through the medium of the lever that is capable of being vibrated the sections may be spread or contracted whereby the beam as a whole is lengthened or shortened, and by such lengthening and shortening of the harrow teeth are given more or less inclination whereby they are adapted for harrowing upon hard or soft soil. A sleeve 21 is mounted loosely for vertical reciprocation upon the lever and is provided with a depending tooth 22, which extends below the bifurcation of the lever and can engage with any of the notches of the locking bar, whereby said lever becomes locked and the sections of the beam secured at any point of adjustment. A bell cranked hand lever 23 is pivoted to the lever 18ª and is connected by a link 24 with the sliding locking sleeve. Located in rear of the upper end of the hand lever is a flat spring 25, and the same is loosely pivoted at its lower end to the before mentioned locking sleeve.

The T-shaped standards 10 support the telescopic bars 11 and 12, and in fact the end harrow-bars are fulcrumed on said telescopic bars whereby they can readily turn or rock, and for facilitating this movement the said T-shaped standards have their upper ends or faces convexed. Such being true it will be readily seen that by reason of the connections throughout the series of harrow-bars all the said harrow-bars are in a manner thus fulcrumed through the medium of the end harrow-bars—that is to say, that any rocking motion given the end harrow-bars by a manipulation of the hand-lever will be transmitted to the entire series of harrow-bars.

From the foregoing description, in connection with the accompanying drawings, it will be seen that we have provided a harrow embodying simplicity of construction, cheapness and durability, that is designed to effectually cultivate and thoroughly pulverize either hard or soft soil, and which may be regulated readily by the movement of a small lever always within grasp of the operator.

Having described our invention, what we claim is—

1. In a harrow the combination with a series of transverse harrow bars provided with depending rigid teeth, of a series of clips secured to the bars and arranged at an angle thereto, said clips being provided at opposite sides with eyes, links located in the eyes and loosely connecting the bars, central clips mounted on the end bars and provided with eyes, and upon their upper sides with T-shaped standards, an extensible beam mounted on the T-shaped standards and loosely connected at its ends to said central clips, and means for adjusting said beam, substantially as specified.

2. In a harrow the combination with the series of transverse harrow bars provided with depending teeth, clips located on the bars near their ends and provided at diametrically opposite sides with eyes, said clips being arranged at an angle to the bars, and links loosely connecting the clips, of central clips mounted on the end bars of the series provided with eyes, and upon their upper sides with T-shaped standards, of a pair of beam sections located side by side each provided with keepers for loosely engaging the other and engaging curved locking standards mounted on one of the sections and with a bearing block located upon the under side of said section, a standard located within the locking bar and mounted upon the remaining section, links connecting the extremities of said sections with the eyes of the center clips, a bifurcated lever embracing the sections and locking bar and pivoted to the bearing block and standard of said sections, a locking sleeve mounted on the lever and having a depending tooth engaging the locking bar and bell cranked hand lever pivoted on the lever, a spring interposed between the upper end of the same and said lever, and a link loosely connecting the lower branch of the bell cranked lever with the sleeve, substantially as specified.

In testimony that we claim the foregoing as our own we have hereto affixed our signatures in the presence of two witnesses.

CHARLES ALBERT ANDERSON.
JOHN SMALLWOOD WINSTON.

Witnesses:
JAS. D. HOPEWELL,
WORTH ANDERSON.